United States Patent Office 3,548,636
Patented Dec. 22, 1970

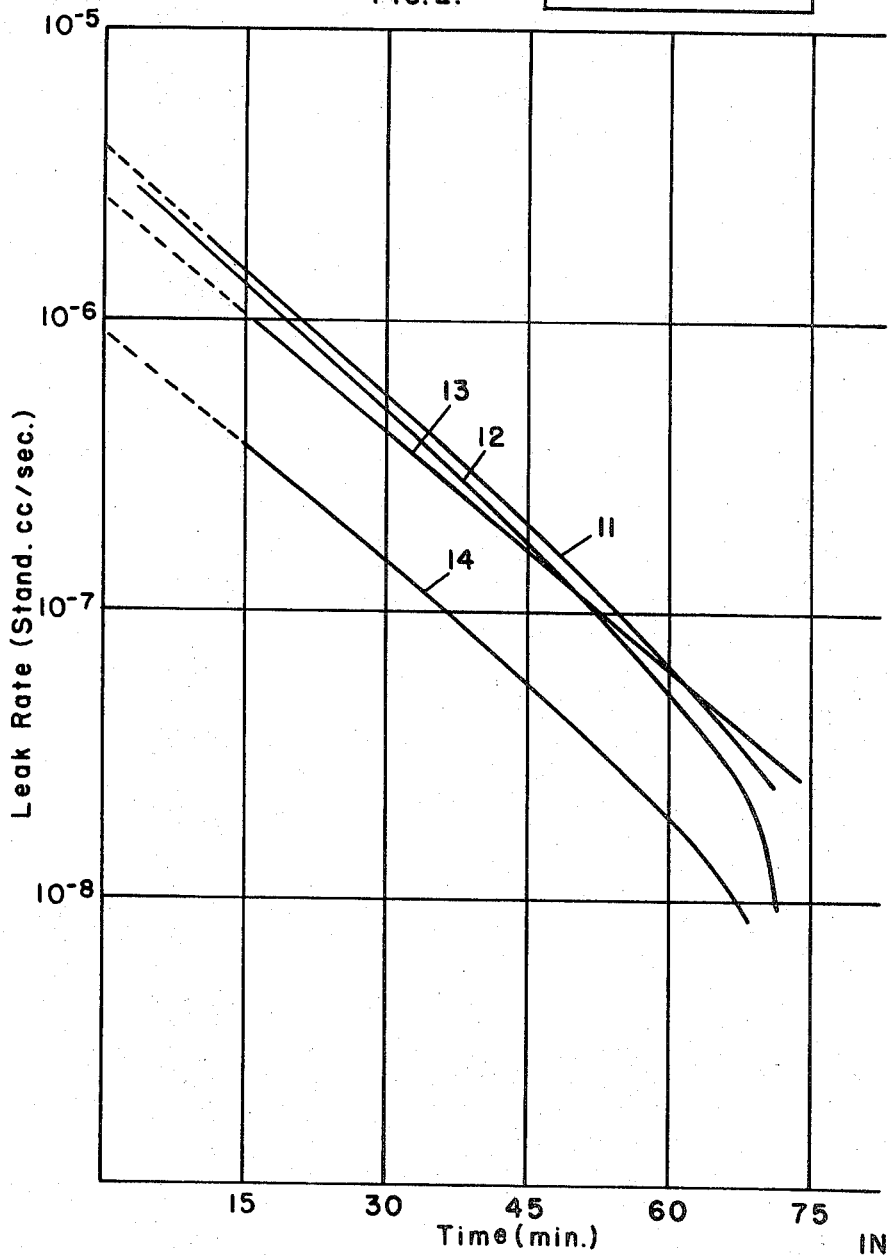

3,548,636
METHOD FOR DETECTING LEAKS IN HERMETICALLY SEALED CONTAINERS
Irving Litant, Lexington, Mass., assignor to the United States of America as represented by the Administrator of the National Aeronautics and Space Administration
Filed Sept. 30, 1968, Ser. No. 763,685
Int. Cl. G01m 3/06, 3/20
U.S. Cl. 73—40.7                     11 Claims

ABSTRACT OF THE DISCLOSURE

A leak detection method wherein the hermetically sealed container is vacuum heated and then immersed in a relatively cool bath of a detection fluid such as trichlorofluoromethane. Should leaks exist the detection fluid is drawn to the interior of the container by the resulting reduction of pressure. After all traces of the fluid are removed from the surface of the container, leaks are detected by means of a halogen detector or by observance of bubbles when the container is immersed in a second liquid.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to a leak detection method and is especially suited for detecting leaks in hermetically sealed containers.

Hermetically sealed containers are utilized in various fields to protect products from contamination resulting from exposure to the atmosphere. This practice is particularly common in the electronics industry wherein many components such as transistors, integrated circuits, relays, etc. are protectively sealed in small metal cans. After having been sealed, the gas tightness of these cans must be tested to insure that the enclosed components will remain isolated from environmental conditions.

Various methods are now used to test hermetically sealed enclosures and, frequently different methods are required depending upon the sizes of the leaks being detected. Leak sizes are empirically defined as gross or fine with a gross leak permitting passage of up to $1 \times 10^{-5}$ atmospheric cubic centimeters of air per second (std. cc./sec.) and a fine leak permitting air flow in the range between $1 \times 10^{-5}$ and $1 \times 10^{-8}$ std. cc./sec. per second.

According to one detection method, hermetically sealed electrical components are immersed in a detergent and water solution and pressurized to three or four atmospheres for a period of between four and sixteen hours. The components are then tested to determine whether any changes have occurred in their electrical characteristics. Naturally, the existence of such a change indicates that the component has been contacted by solution that was forced through a leak in the sealed enclosure during the pressurizing operation. Another leak detection method entails the immersion of the sealed container in a bath of ethylene glycol heated to a temperature of between 125° and 150° C. The appearance of bubbles in the ethylene glycol bath indicates that expanding gas is escaping through a leak in the sealed container.

According to another method, most commonly used to detect fine leaks, the sealed enclosure is pressurized with helium gas at between three and four atmospheres for over one hour. The sealed component is subsequently placed in a vacuum chamber which is evacuated. Helium leaking out of any leak in the sealed container is then detected by a specially modified mass spectrometer. In another very similar method, a radioactive gas is used during the pressurizing step and leaks are detected with a scintillation counter.

Another known method of leak detection entails the sequential steps of weighing, pressurizing in an FC-75 fluorocarbon and re-weighing a hermetically sealed container. A weight increase indicates that the container possesses a leak through which the fluorocarbon was forced during the pressurization step. Still another leak detection method involves the use of fluorocarbons. During this method, the container is pressurized in Freon 113 before immersion in a bath containing FC-75 fluorocarbon at about 70° C. The appearance of bubbles in the fluorocarbon bath is an indication that Freon 113 first entered the container during the pressurizing step and is now escaping through a leak in the sealed container.

The above described leak detection methods suffer from a number of both common and independent disadvantages. For example, the range of leak sizes detected by individual methods is relatively narrow so that separate tests must be made to detect both gross and fine leaks. Also, most of the tests are cumbersome because of requirements for extensive periods of gas or liquid pressurization and procedural manipulations that are tedious and subject to operator error. Still another problem is detection inefficiency which is particularly prevalent in the above described ethylene glycol test. Because that test relies upon gas expansion in the order of only 45 percent, many leaks are not detectable. Furthermore, in some instances a false indication can result from the appearance in the liquid bath of bubbles from a source other than leaks in the sealed container being tested.

The object of this invention, therefore, is to provide a more efficient method for detecting and determining the location of leaks in hermetically sealed containers.

SUMMARY OF THE INVENTION

The invention is characterized by the provision of a leak detection method wherein a detection liquid is introduced into a hermetically sealed container through any leak therein, the introduced detection liquid is heated and vaporized within the container, and resultant vapor escaping through the leak in the container is detected. Because of the large pressure change that occurs within the container upon a change of state in the detection liqiud, extremely small leaks can be easily detected by this method. Furthermore, the method minimizes procedural requirements and is readily adapted to automation.

A feature of the invention is the provision of a leak detection method of the above type wherein the vapor detection step entails immersing the container in a liquid bath and observing bubbles formed therein by vapor escaping through the walls of the container. This method has minimal equipment requirements and is suitable for detection of gross leaks.

Another feature of the invention is the provision of a leak detection method of the characterized type wherein the detection liquid has a boiling temperature below 50° C. Use of a detection liquid with a relatively low boiling point greatly simplifies the procedural requirements of the method.

Another feature of the invention is the provision of a leak detection method of the above featured type wherein the detection liquid comprises a halogen containing compound. Chemically inert, halogen containing liquids possess various properties that are uniquely suited to the above described method.

Another feature of the invention is the provision of a leak detection method of the above featured type wherein the vapor detection step encompasses detection of the escaping vapor with a conventional halogen leak detector. According to this method, leaks permitting gas flow rates as small as $1 \times 10^{-10}$ std. cc./sec. can be detected.

Another feature of the invention is the provision of a leak detection method of the above featured type wherein the vapor detection step involves sniffing the outer surface of the container with a probe operatively connected to the halogen leak detector. By selectively moving the probe about the outer surface of the container, the exact locations of detected leaks can be determined.

Another feature of this invention is the provision of a leak detection method of the above featured types wherein the detection liquid introduction step includes the steps of first heating in an evacuated oven and then immersing the heated container in a bath of the detection liquid. During the vaccum heating operation, air is removed from the container through any leak existing therein. Subsequently, in the relatively cold environment provided by the detection liquid bath, there is formed within the container a partial vacuum that draws detection liquid into the container through the existing leak.

DESCRIPTION OF THE DRAWING

FIG. 1 is a flow diagram illustrating a preferred embodiment of the invention; and FIG. 2 is a graph having curves representing leaks detected according to the invention. Leak rates in standard cubic centimeters per second are plotted vs. time in minutes.

DESCRIPTION OF THE INVENTION

According to the present invention, a suitable detection liquid is introduced through any leak existing is a hermetically sealed container being tested. The introduced detection liquid is then permitted to vaporize. Because of the the substantially increased internal vapor pressure produced by the change of state in the detection liquid, the resultant vapor escapes through the leak in the container's walls at an elevated rate that is readily detectable.

Highly preferred detection liquids include chemically inert, halogen-containing liquids with relatively low boiling points. Such liquids are easily vaporized and experience during a change from a liquid to vapor state volume increases of as much as 130 times. In addition, the preferred halogen containing liquids have extraordinarily low surface tensions enabling them to penetrate extremely small orifices. These properties are obviously quite beneficial to the practice of the described leak detection method. Halogen-containing liquids found particularly useful are trichlorofluoromethane, $CCL_3F$ with a boiling point of 24.1° C. and a fully fluorinated material marketed by the Minnesota Mining, and Machinery Co. under the trade name FG–32 and having a boiling point of 32° C. Both of these detection liquids have the above noted desirable properties and a relatively inexpensive.

Another advantage of halogen-containing detection liquids is that they permit the use of conventional halogen detectors for detecting vapor discharged through a leak in the container being tested. Generally, halogen leak detectors include a vacuum pump that draws air from a sensing probe to a detector element consisting of a heated, positively charged, platinum emitter within a cylindrical collector. The detector responds to the presence of halogen vapor with an increase of current between the emitter and collector electrodes. Such instruments have sensitivities capable of detecting leaks as small as $1 \times 10^{-10}$ std. cc./sec. Furthermore, with hyperdermic needle type probes, the precise location of existing leaks can be established for even very small containers. Leak location is determined by merely moving the probe slowly over the surface of the sealed container until the presence of halogen is indicated by the detector instrument. The specific leaks measured by the detector in this way can be related to actual leaks by use of a factor dependent upon the properties of the detection liquid utilized. It should be noted that a needle probe is not necessary for detecting gross leaks. For these, positioning of the probe anywhere near the device will give an indication of a leak.

A preferred method for initially introducing the detection liquid into the tested container involves a vacuum heating process. According to this method the sealed container is first heated in an evacuated oven resulting in the removal of air through any leak therein. The heated container is then immersed in a bath of the detection liquid which is preferably maintained at a reduced temperature. Responsive to the relatively cold environment provided by the liquid bath, the internal pressure of the container is quickly reduced to substantially less than atmospheric. Because of this reduced pressure, the detection liquid is readily drawn through the leaks in the container's walls. The inherently low surface tension of the halogenated liquids employed permits them to penetrate more easily into fine leaks. After removal from the bath, any detection liquid adhering to the outer surfaces of the container evaporates rapidly. Externally adhering liquid not removed could be detected during the subsequent detection step giving a false indication of a leak. For this operation also, detection liquid with a relatively low boiling temperature of, for example, less than 50° C. are highly desirable. Complete evaporation removal of such liquids from the container's outer surface is quickly and easily accomplished at room temperature with a simple blowing operation.

In a specific example of the invention, an integrated electronic circuit enclosed within a 0.220" by 0.220" hermetically sealed can was heated in a vacuum oven at about 125° C. for ten minutes. Next, the can was removed from the oven and immersed in a bath of trichlorofluoromethane which was maintained at a temperature between 0° and 5° C. After one hour in the cold detection liquid, the can was removed and quickly blown dry with nitrogen to remove any detection liquid still adhering to its outer surfaces. Finally, a hyperdermic needle probe connected to a conventional halogen leak detector was moved slowly about the surface of the can and four distinct leaks were located and measured. A flow diagram illustrating these steps is shown in FIG. 1.

The four curves 11–14 in FIG. 2 represents the measured leaks with time in minutes plotted as the abscissa and leak rate in standard cubic centimeters per second plotted as the ordinate. This example illustrates the ease with which extremely small hermetically sealed containers can be accurately leak checked. The plotted curves also indicate the extensive time periods over which existing leaks are detectable. As shown the four leaks were observed over a period of 75 minutes during which the measured leaks fell from values in the $10^{-6}$ std. cc./sec. range to the $10^{-8}$ std. cc./sec. range.

According to another method embodiment of the invention, a detection liquid is first introduced into a hermetically sealed container through any leaks therein as described above. Next, the container is submerged in a suitable test liquid maintained above the boiling temperature of the detection liquid. The appearance of bubbles on the surface of the submerged container indicates the existence and location of openings through which vaporized detection liquid is escaping. Since this method does not utilize a leak detection instrument, this method has the advantage of minimal required equipment costs. However, only leaks in the gross leak range can be readily detected in this manner.

In a specific example of this type a 0.220" x 0.220" x 0.050" hermetically sealed can was heated in a vacuum oven at about 125° C. for ten minutes. Next, the heated can was removed from the oven and submerged in a bath of trichlorofluoromethane which was maintained at a temperature between 0° and 5° C. After one hour in the cold detection liquid, the can was removed and quickly blown dry with nitrogen to remove adhering detection liquid. Finally, the dry can was immersed in a bath of ethylene glycol maintained at about 125–150° C. The existence and location of several gross leaks were indicated by escaping vapor bubbles formed on the surface of the submerged can.

Obviously, many modifications and variations of the present invention are possible in light of the above teachings. For example only, detection liquids other than both specifically mentioned can be desirable for leak detection. It is to be understood, therefore, that within the scope of the appended claims the invention can be practiced otherwise than as specifically described.

What is claimed is:

1. A method for detecting a leak in a hermetically sealed enclosure comprising the steps of introducing a detection liquid into the enclosure through any leak therein, said introducing step accomplished by heating the enclosure and immersing the heated enclosure in a bath of detection liquid having a boiling temperature below 50 degrees C., vaporizing the detection liquid introduced into the enclosure, and, detecting vapor generated during said vaporizing step and escaping through any leak in the enclosure.

2. A method according to claim 1 wherein said enclosure heating step comprises heating the enclosure in an evacuated oven.

3. A method according to claim 2 wherein the detection liquid comprises a halogen containing compound.

4. A method according to claim 3 wherein said detecting step comprises detecting the escaping vapor with a halogen detector.

5. A method according to claim 4 wherein said detecting step comprises positioning adjacent the enclosure a probe connected to the halogen detector.

6. A method according to claim 2 wherein said detecting step comprises immersing the enclosure in a liquid bath and observing bubbles formed by the escaping vapor.

7. A method according to claim 1 including the step of removing externally adhering detection liquid from the enclosure after said immersing step and before said detection step.

8. A method according to claim 7 wherein the detection liquid comprises a halogen containing compound.

9. A method according to claim 8 wherein said detecting step comprises detecting the escaping vapor with a halogen detector.

10. A method according to claim 9 wherein said detecting step comprises positioning adjacent the enclosure a probe connected to the halogen detector.

11. A method according to claim 7 wherein said detecting step comprises immersing the enclosure in a liquid bath and observing bubbles formed by the escaping vapor.

References Cited

UNITED STATES PATENTS

| 2,550,498 | 4/1951 | Rice | 73—40.7X |
| 1,995,699 | 3/1935 | Baker | 73—45.5 |

FOREIGN PATENTS

| 944,402 | 12/1963 | Great Britain | 73—40.7 |

S. CLEMENT SWISHER, Primary Examiner

U.S. Cl. X.R.

73—45.5, 49.2